(12) United States Patent
Liang

(10) Patent No.: US 7,676,994 B2
(45) Date of Patent: Mar. 16, 2010

(54) GREENHOUSE

(75) Inventor: Tsun-Hsiao Liang, Chang Hua Hsien (TW)

(73) Assignee: Jiann Shing Hardware Co., Ltd., Puu Yuen, Chang Hua (TW)

( * ) Notice: Subject to any disclaimer, the term of this patent is extended or adjusted under 35 U.S.C. 154(b) by 92 days.

(21) Appl. No.: 12/144,533

(22) Filed: Jun. 23, 2008

(65) Prior Publication Data

US 2009/0126310 A1   May 21, 2009

(30) Foreign Application Priority Data

Nov. 20, 2007   (DE) .................. 20 2007 016 180 U

(51) Int. Cl.
*E04B 1/12*   (2006.01)
*E04B 1/00*   (2006.01)
*A01G 9/00*   (2006.01)

(52) U.S. Cl. .................................. 52/63; 52/222; 47/17

(58) Field of Classification Search .................. 135/115, 135/119, 120.3, 121, 122, 158, 87, 909, 913; 160/330, 395; 285/404; 47/1.01 R, 17, 18, 47/19.1, 19.2, 20.1, 29.1, 29.3, 29.5, 29.6; 52/222, 63, 637, 638, 639, 643, 653.2, 655.2, 52/690, 691, 692, 693, 694

See application file for complete search history.

(56) References Cited

U.S. PATENT DOCUMENTS

| 2,245,961 | A | * | 6/1941 | Clay | 160/395 |
|---|---|---|---|---|---|
| 4,084,598 | A | * | 4/1978 | Rainwater | 135/121 |
| 5,555,681 | A | * | 9/1996 | Cawthon | 52/63 |
| 5,660,002 | A | * | 8/1997 | Lashinger | 52/63 |
| 6,098,335 | A | * | 8/2000 | Brown, Jr. | 47/17 |

* cited by examiner

*Primary Examiner*—Richard E Chilcot, Jr.
*Assistant Examiner*—Benjamin Pevarski
(74) *Attorney, Agent, or Firm*—Egbert Law Offices PLLC

(57) ABSTRACT

The present invention provides an improved greenhouse, improving upon the shortcomings of a typical greenhouse with difficult assembly and handling. The greenhouse is assembled by a plurality of trusses, which are combined through a plurality of erection tubes along with the covering and a plurality of angled elements. The covering directly couples onto the erection tubes, which are coupled via angled elements to form a greenhouse, thereby achieving rapid assembly/disassembly and handling of spare parts. The retaining portion of the covering is provided with layering, so that the covering could be supported and leveled by the layering to provide a smooth greenhouse with improved applicability.

9 Claims, 14 Drawing Sheets

GREENHOUSE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a greenhouse, and more particularly to an innovative greenhouse structure having easy and rapid assembly with space-saving properties.

2. Description of Related Art Including Information Disclosed Under 37 CFR 1.97 and 37 CFR 1.98.

Agricultural crops or flowers are generally cultivated in an open environment, where they are vulnerable to adverse climate, temperature and mosquito invasion. To provide a favorable living environment for agricultural crops or flowers, a greenhouse is perfectly suitable for maximizing cultivation conditions. The greenhouse allows control over humidity and temperature, being adjusted dependent upon growth characteristics of the particular agricultural crop or flower.

FIG. 1 depicts an assembled perspective view of atypical greenhouse, wherein the greenhouse 1 is provided with a roof truss 10. The truss 10 is fitted with a plurality of translucent sheets 11. It is possible to control the temperature and humidity in the truss 10 to meet the requirements of the user. To guarantee excellent resistance and stronger endurance, the truss 10 is made of metal materials, such as aluminum alloy, while the translucent sheet 11 is made of glass and strengthened acryl materials.

FIG. 2 depicts another assembled perspective view of a typical greenhouse, wherein the greenhouse 2 is provided with a roof truss 20. The truss 20 is covered with flexible yarn net 21, so it is possible to control the temperature and humidity in the truss 20 to meet the requirements for easy disassembly and assembly. The truss 20 is generally assembled with metal rods and simple connection components, such as screws and fasteners. Then the yarn net 21 is covered onto the truss 20. The yarn net 21 is generally made of nylon net and plastic cloth for rapid disassembly and assembly.

However, there are shortcomings observed during actual applications.

Despite the stronger resistance structure of greenhouse 1, the truss 20 must be erected according to the terrain and environment. Meanwhile, the bulky truss 1 and solid translucent sheet 11 of greater weight makes it difficult for handling and assembly.

Despite the advantages of greenhouse 2, such as rapid disassembly and assembly, the truss 20 has weaker resistance and structural strength. The truss 20 is also limited to the erection height. Meanwhile, the yarn net 21 covered onto the truss 2 will make it easier to accumulate dust and grease, reducing airflow.

Thus, to overcome the aforementioned problems of the prior art, it would be advancement in the art to provide an improved structure that can significantly improve efficacy.

Therefore, the inventor has provided the present invention of practicability after deliberate design and evaluation based on years of experience in the production, development and design of related products.

BRIEF SUMMARY OF THE INVENTION

There is enhanced efficacy of the present invention.

Based on the present invention, a plurality of erection tubes 32 are assembled along with the covering 31 and a plurality of angled elements 33. The covering 31 is directly assembled onto the erection tubes 32, which are coupled via angled elements 33 to form a greenhouse 3, thereby improving upon the complex assembly procedure of the prior art and the handling cost of spare parts. With assembly of angled elements 33B and erection tubes 32, it is possible to realize rapid assembly/disassembly and handling as well as unlimited extension with improved applicability.

When the greenhouse 3 is assembled and constructed, the covering 31 is directly coupled onto the erection tubes 32, and the layering 34 is sleeved into the retaining portion 310 of the covering 31. Thus, the covering 31 can be fully supported and leveled without a folding problem on the surface of greenhouse.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
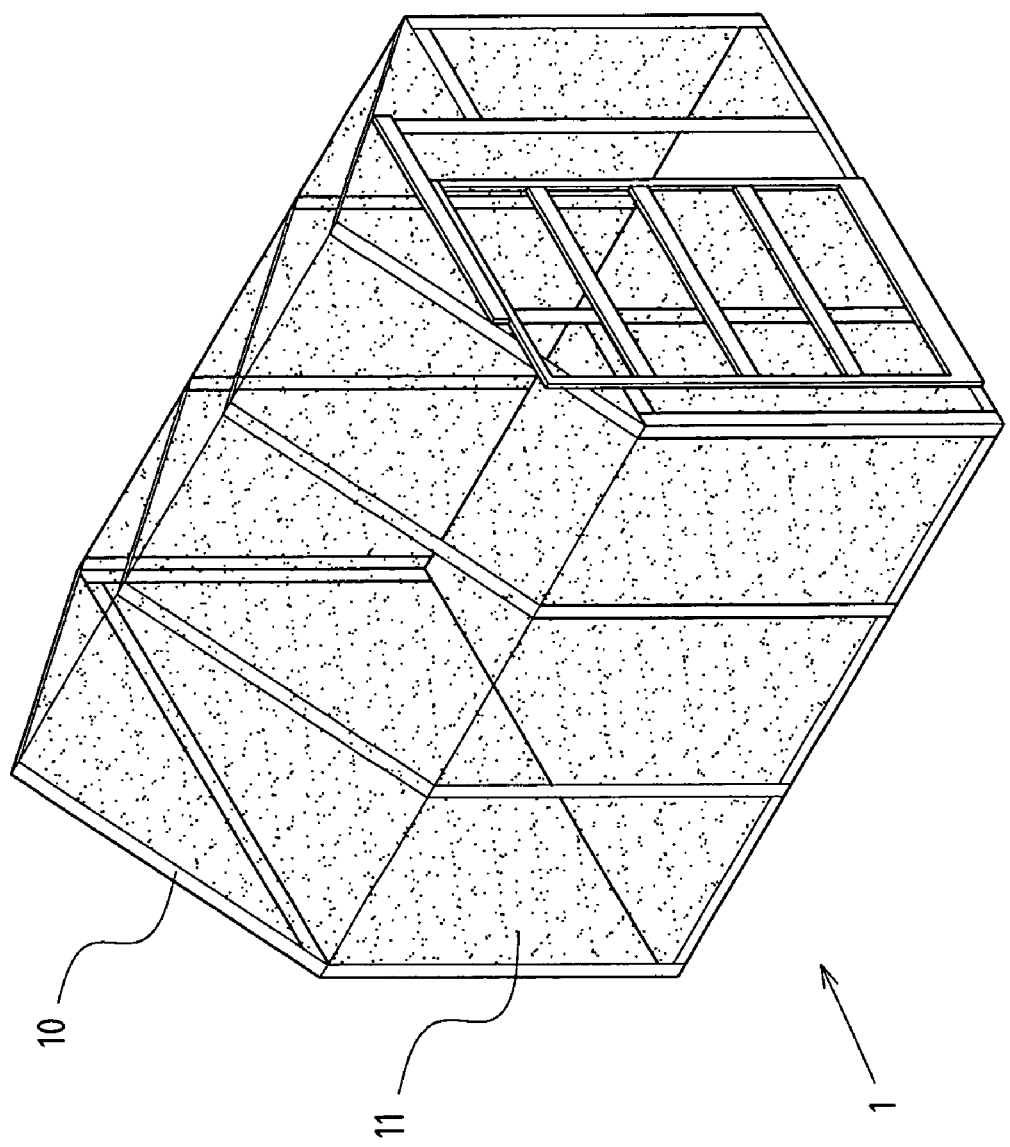
FIG. 1 depicts an assembled perspective view of typical greenhouse.
Figure 2:
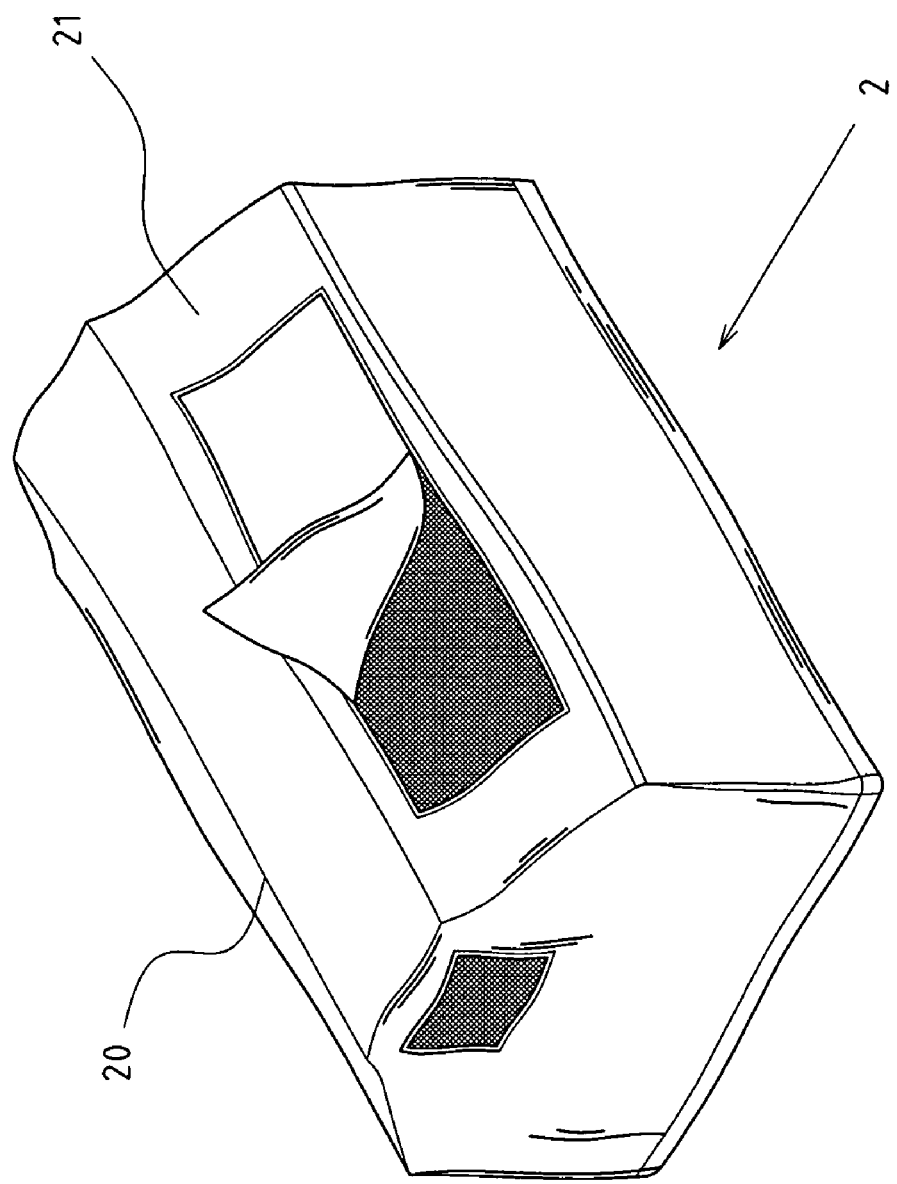
FIG. 2 another assembled perspective view of typical greenhouse.
Figure 3:
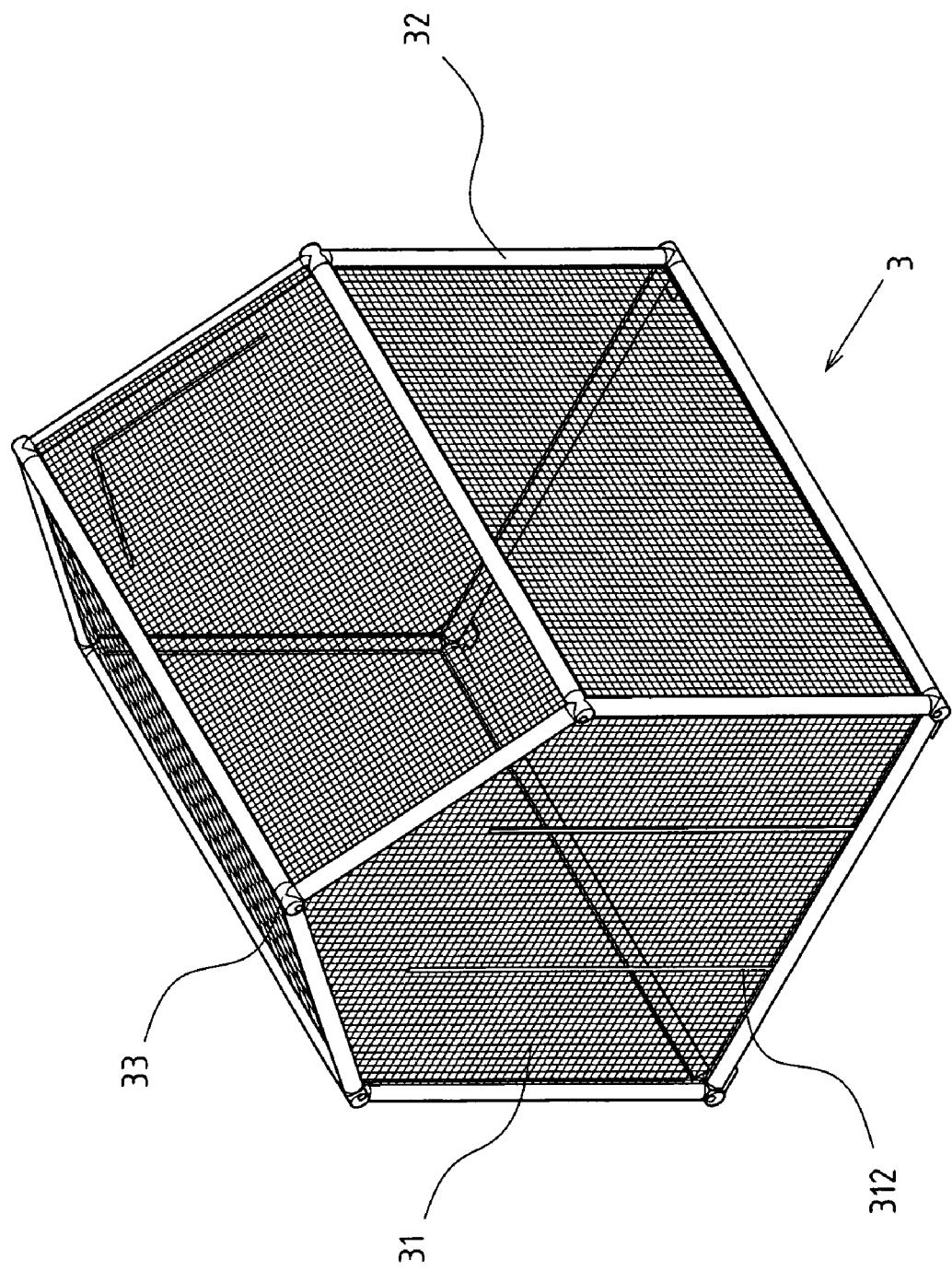
FIG. 3 depicts an assembled perspective view of the present invention.
Figure 4:
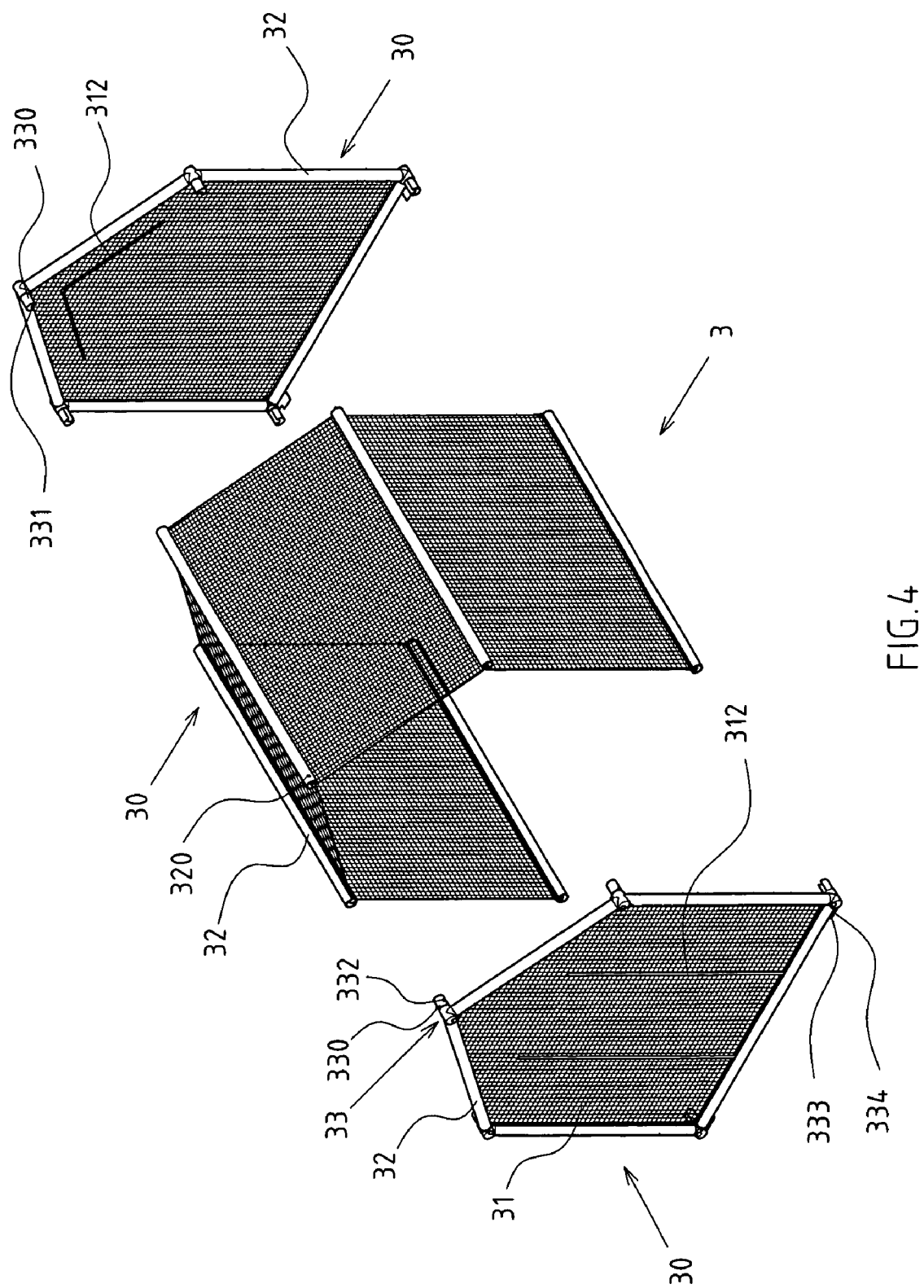
FIG. 4 depicts an exploded perspective view of the present invention.
Figure 5:
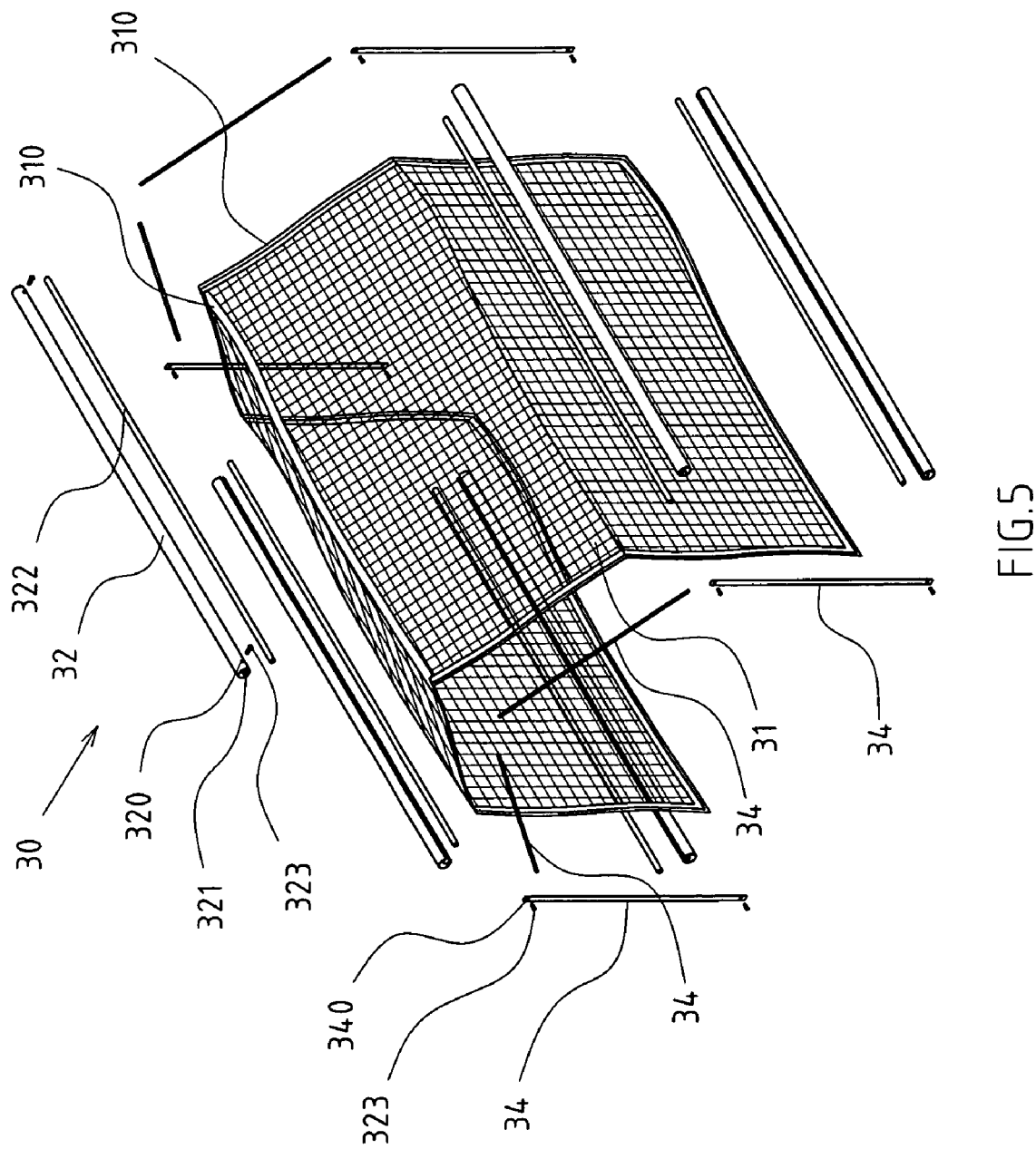
FIG. 5 depicts a partially exploded perspective view of the present invention.

The features and the advantages of the present invention will be more readily understood upon a thoughtful deliberation of the following detailed description of a preferred embodiment of the present invention with reference to the accompanying drawings.

FIGS. 3-12 depict preferred embodiments of an improved greenhouse of the present invention. The embodiments are provided only for explanatory purposes with respect to the patent claims.

The greenhouse 3 is provided with a truss 30 that comprises a covering 31, a plurality of erection tubes 32 and a plurality of angled elements 33.

Two hollow retaining portions 310 are arranged at both sides of the covering 31, and a tripping portion 312 is properly placed onto the covering 31. The tripping portion 312 is opened or closed by either a zipper, button, magnet, and fastener. Moreover, the covering 31 is made of permeable, non-permeable, transparent or non-transparent materials.

The erection tubes 32 are provided with a caulking groove 321 for accommodating the retaining portion 310 and some sections of the covering 31. The rod 322 is penetrated into the retaining portion 310 of the covering 31 and inserted into the caulking groove 321 of erection tubes 32.

The angled elements 33 are provided with a plurality of fixation columns 330 capable of being sleeved into both ends of the erection tubes 32. The fixation columns 330 are fitted with a slot 331 for accommodating the caulking groove 321. An aligned mounting hole 320 is separately placed at the junction between both sides of the erection tubes 32 and fixation columns 330 of the angled elements 33 and positioned securely via a fixture 323, such as a bolt.

A layering 34 could be sleeved into the retaining portion of coverings 31 At least a screw hole 340 is placed at both ends of the layering 34. A through-hole 324 is arranged on the retaining portion 310 corresponding to the screw hole 340, so that the fixture 323 penetrates into the through-hole 324 and screw hole 340 for positioning purposes.

Figure 6:
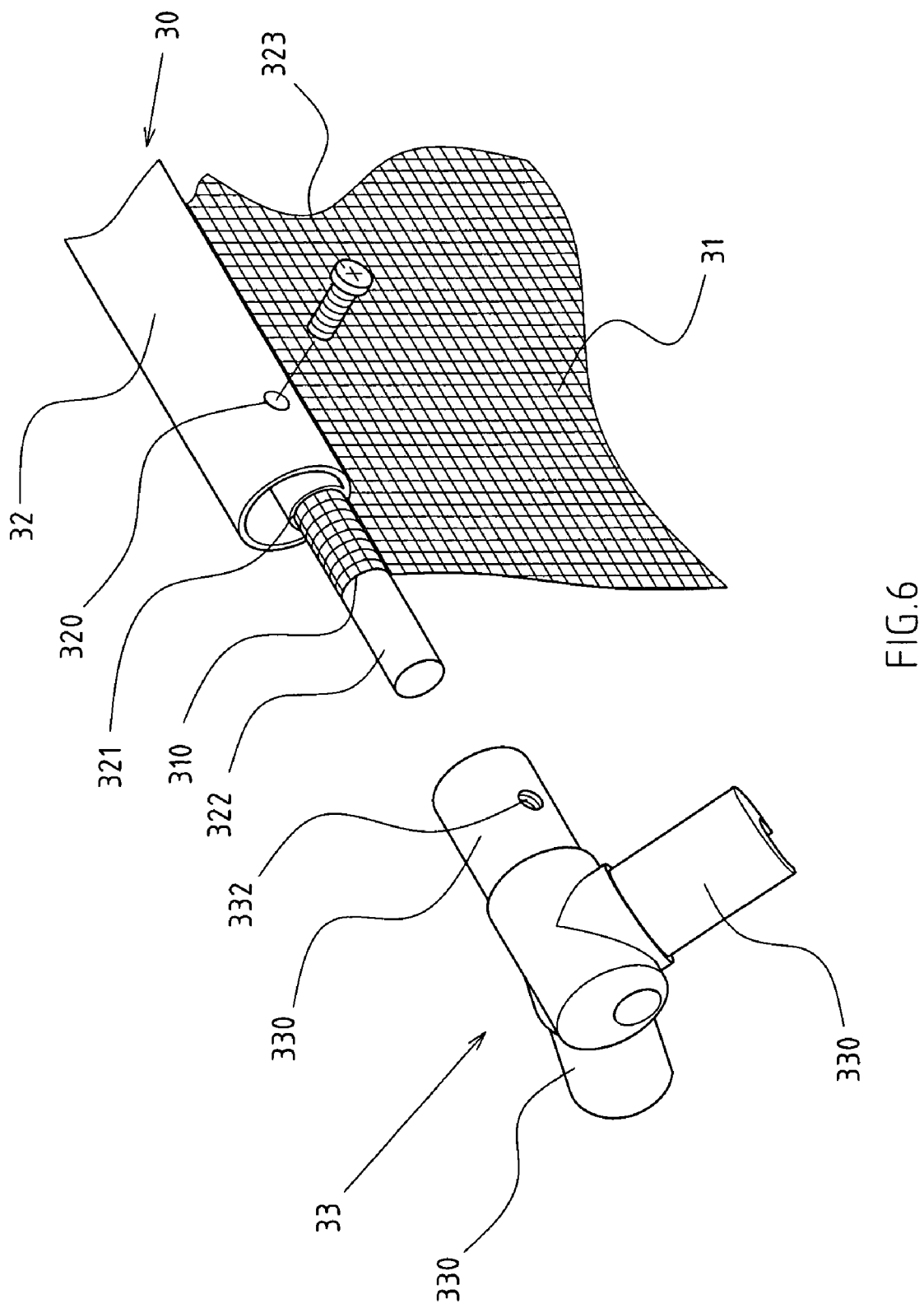
FIG. 6 depicts an assembled perspective view of the present invention.
Figure 7:
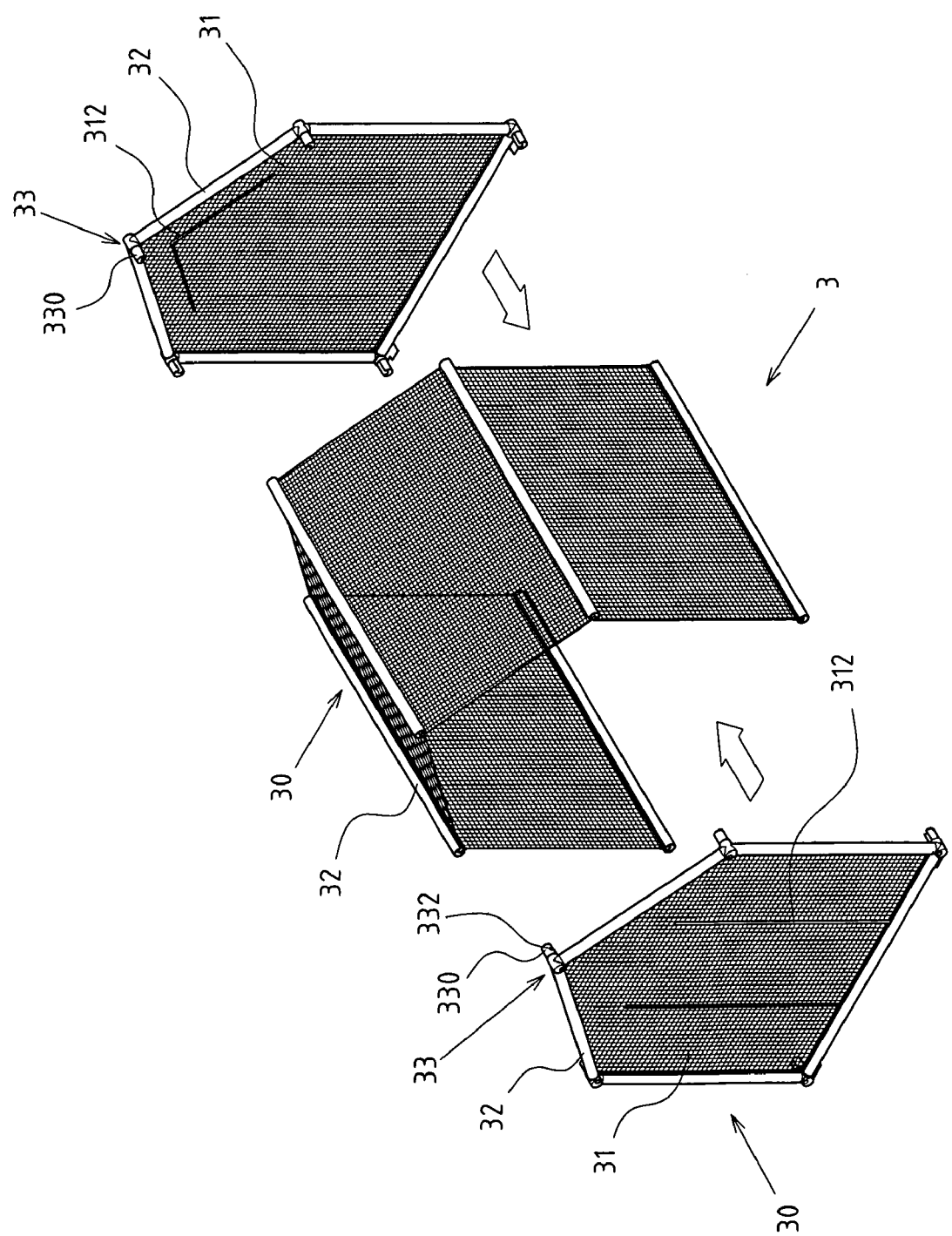
FIG. 7 depicts another assembled perspective view of the present invention.
Figure 8:
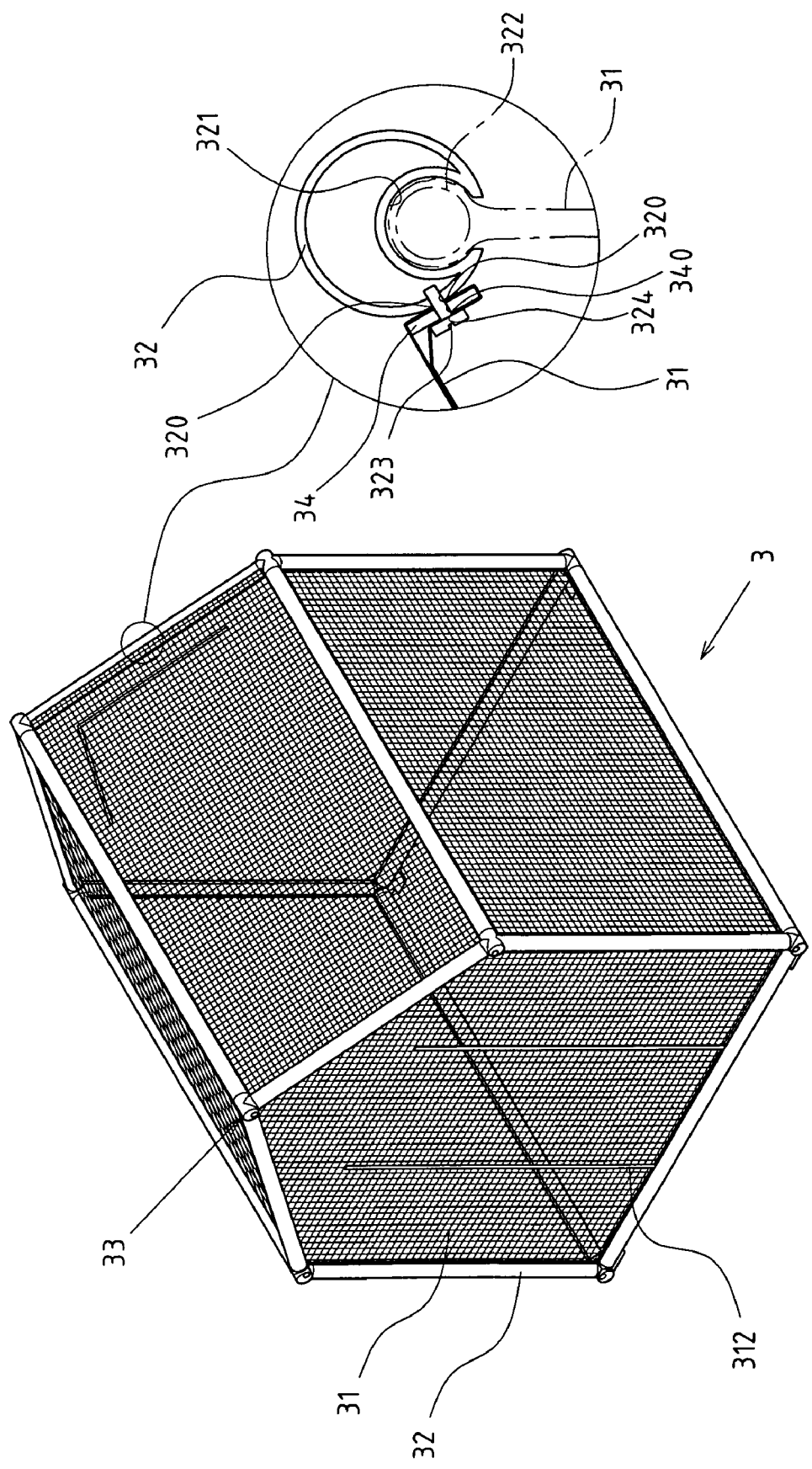
FIG. 8 shows another perspective view of the assembled invention with an isolated sectional view of the connection of the erection tube of the present invention.
Figure 9:
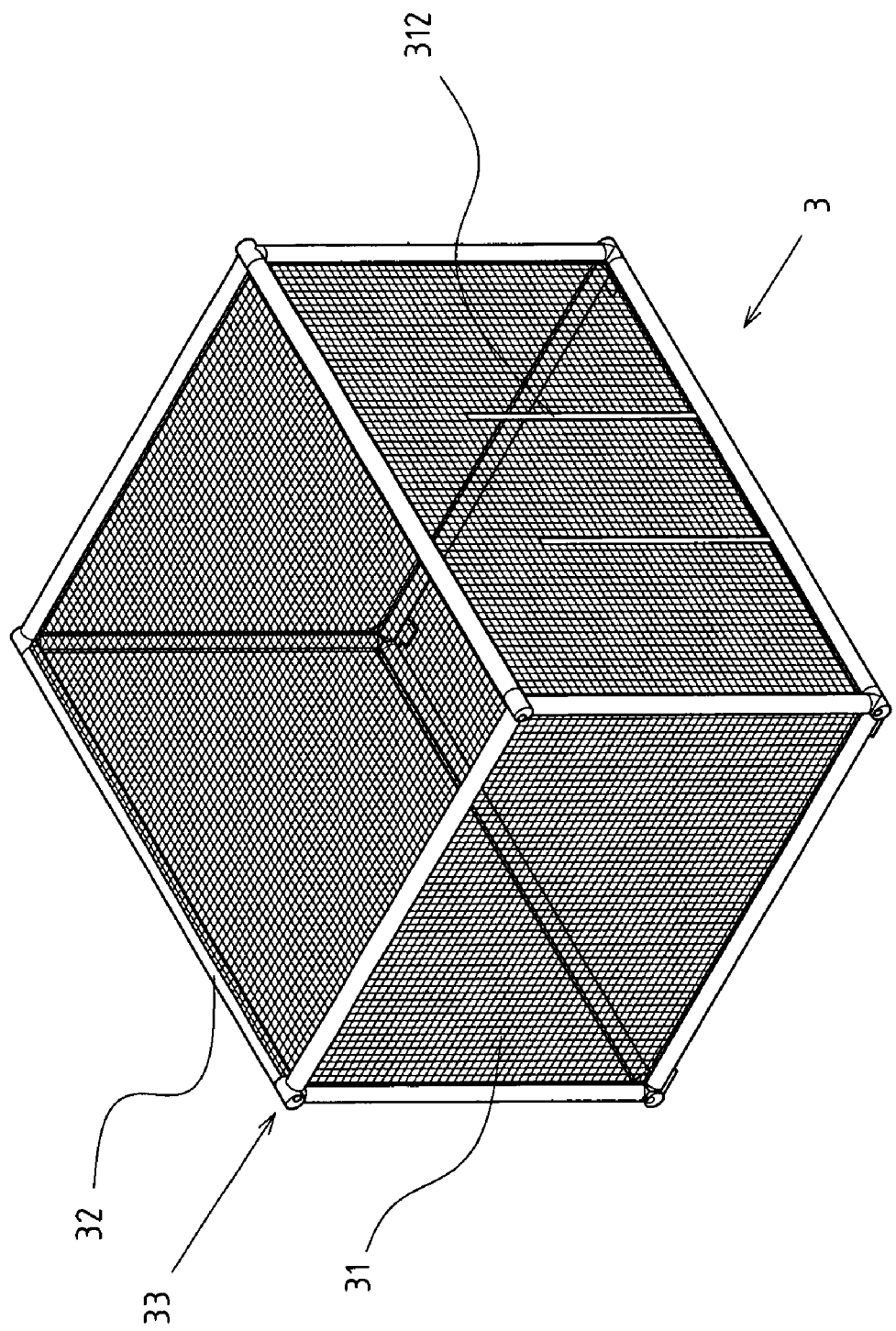
FIG. 9 shows a perspective view of an alternative embodiment of the present invention.
Figure 10:
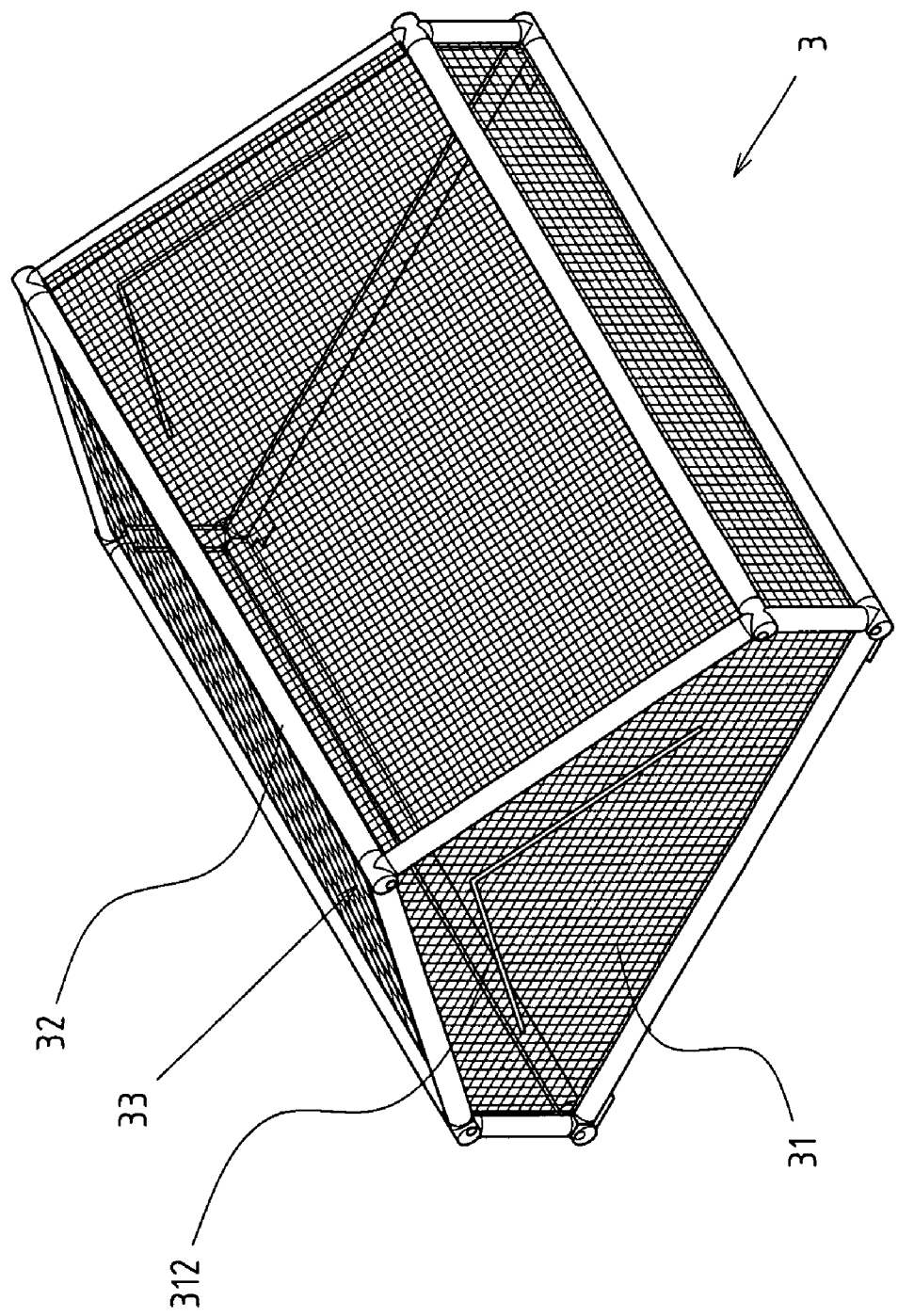
FIG. 10 shows another perspective view of alternative embodiment of the present invention.

Based upon above structures, the present invention is operated as follows:

Referring to FIGS. 6, 7, and 8, the truss 30 is assembled in such a manner that the rods 322 first penetrate into the retaining portion 310 at both sides of the covering 31, then the rods 322 and retaining portion 310 are assembled into the caulking groove 321 of the erection tubes 32. The main framework of a greenhouse 3 is erected after four repetitions of these steps.

Similarly, the lateral framework (e.g. pentagonal body) of the greenhouse 3 is constructed. Then the fixation columns 330 of the angled elements 33 separately penetrate into the erection tubes 32, so that the slot 331 of the fixation column 330 is mated with the caulking groove 321 of the erection tube 32. Next, a fixture 323 is screwed into the mounting holes 320, 332, allowing the erection tubes 32 to be fastened with the angled elements 33.

The lateral framework and main framework of greenhouse 3 are assembled together. First, the layering 34 penetrates into the lateral retaining portion 310 of main framework for supporting the covering 31. Then, the lateral framework is coupled with the main framework in such a manner that the fixation column 330 of angled element 33 of lateral framework is assembled into the erection tube 32 of the main framework and screwed into the mounting holes 320, 332 via a fixture 323. At the same time, the main framework's lateral portion with layering 34 is fixed externally onto the erection tube 32 of the lateral framework, penetrating via a fixture 323 into the through-hole 324 to screw hole 340 and mounting hole 320 (as shown in the enlarged portion of FIG. 8) and assembling said greenhouse 3.

Figure 11:
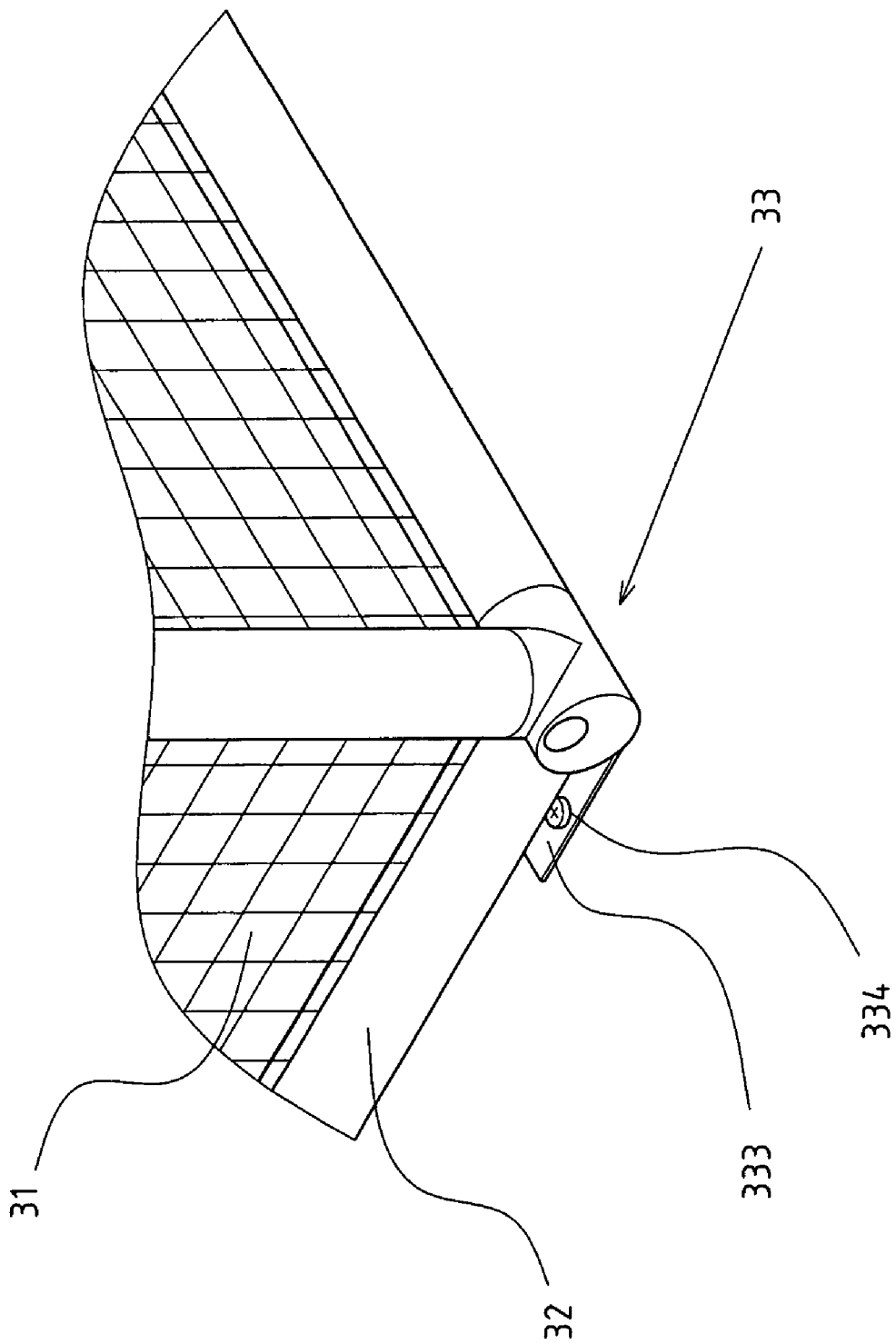
FIG. 11 depicts an isolated perspective view of the bottom of the present invention.

Various forms of greenhouses 3 are assembled depending on the users' requirements, with the preferred embodiment shown in FIG. 11. The angled element 33 at bottom of the greenhouse 3 is provided with mounting plate 333 fitted with punched hole 334, so the greenhouse 3 could be mounted fixedly onto ground by pegs and ropes.

Figure 12:
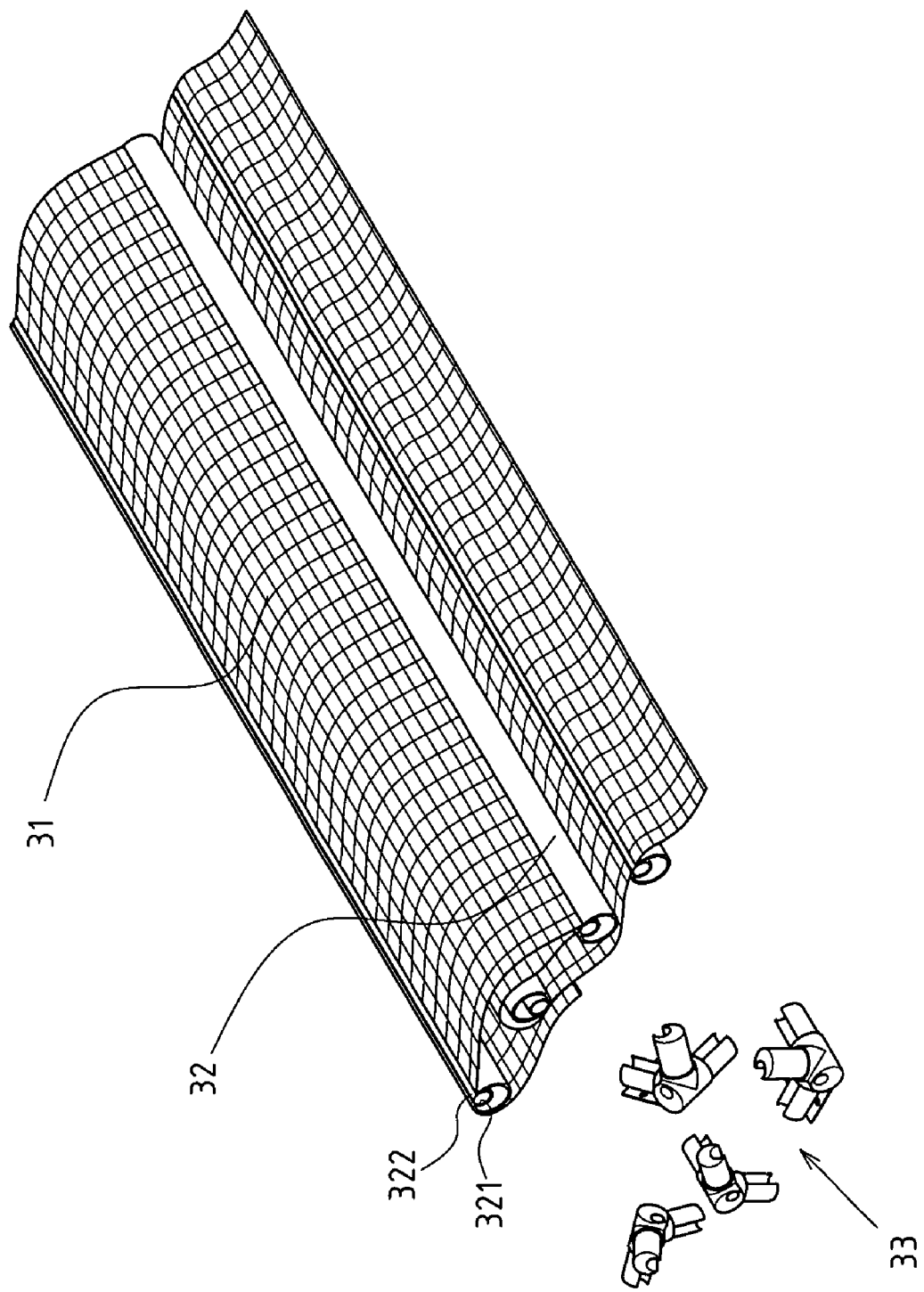
FIG. 12 depicts a perspective view of the retraction of the covering of the present invention.

FIG. 12 depicts a retraction view of the present invention. It is clear that, when the covering 31, erection tubes 32, angled elements 33 and layering 34 of greenhouse 3 are disassembled, convenient and space-saving retraction is possible given the fact that covering 31 is made of flexible plastic cloth, non-woven fabric, and nylon.

Figure 13:
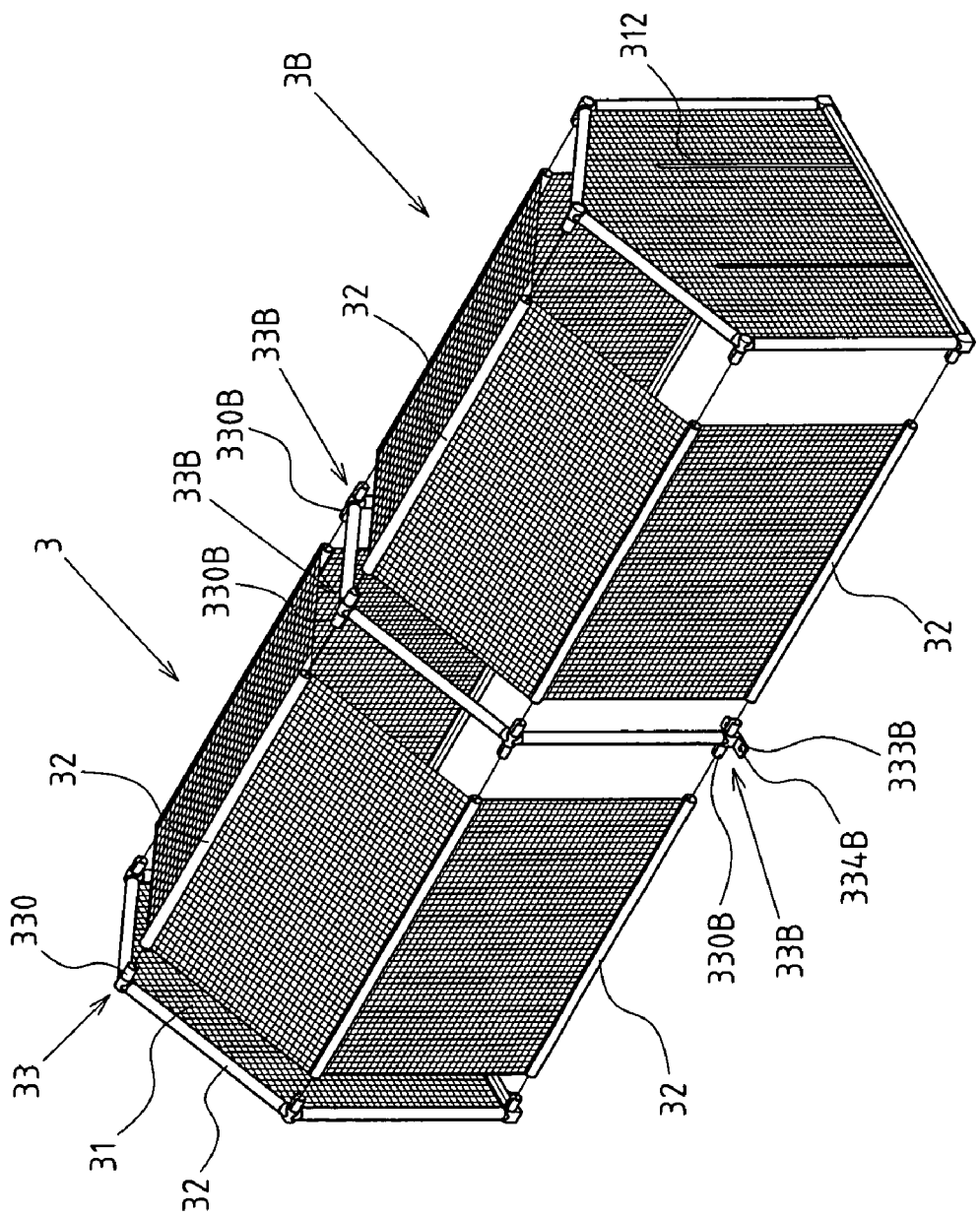
FIG. 13 depicts a perspective view of a multi-extension of the present invention.
Figure 14:
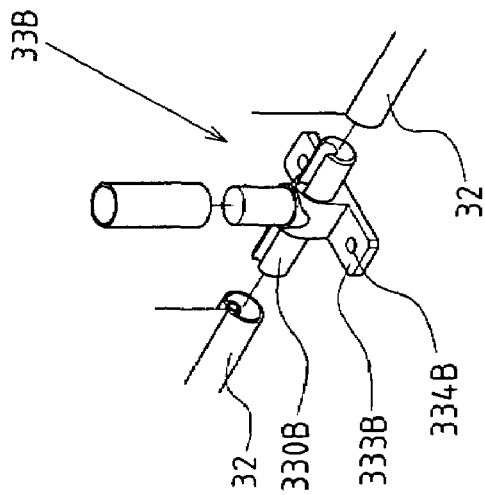
FIG. 14 depicts a partially enlarged perspective view of angled elements of the present invention.
Figure 15:
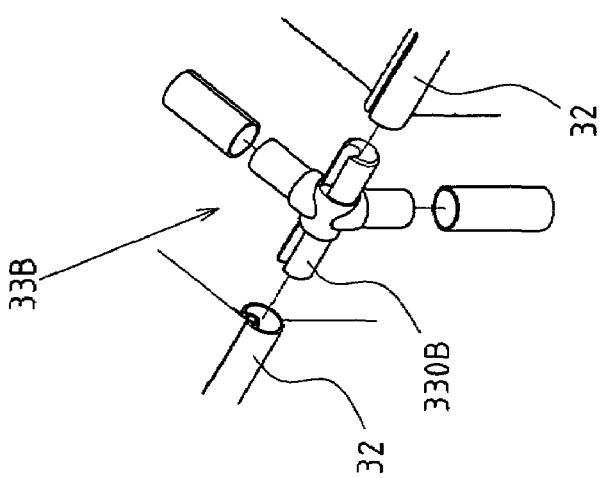
FIG. 15 depicts a second partially enlarged perspective view of angled elements of the present invention.
Figure 16:
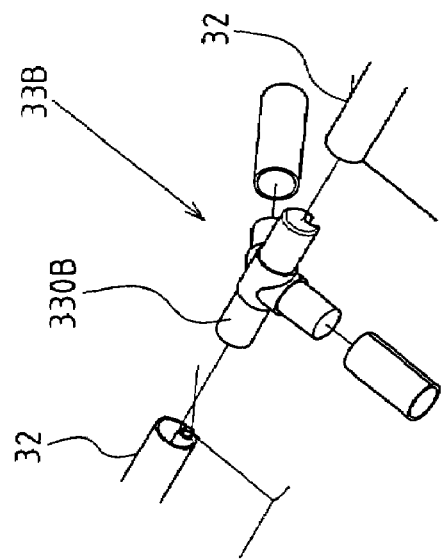
FIG. 16 depicts a third partially enlarged perspective view of the angled elements of the present invention.

Referring also to FIG. 13, when the greenhouse 3 is to be extended, the fixation columns 330B of angled elements 33B are coupled with the erection tubes 32 of another greenhouse 3B. The greenhouse 3, 3B could be mounted fixedly on the ground if pegs and ropes penetrate into the punched hole 334B on the mounting plate 333B of the angled elements 33B. Thus, multiple greenhouses could be expanded through the arrangement of angled elements 33B. FIGS. 14, 15 and 16 depict the partially enlarged perspective view when angled elements 33B are assembled at top, side and bottom of the multiple greenhouses, wherein the fixation column 330B of the angled element 33B is extended towards both ends.

I claim:

1. A greenhouse, comprising:
   a covering, having two hollow retaining portions arranged at both sides thereof; and
   a plurality of trusses, each truss comprising:
      a plurality of erection tubes, each erection tube having a caulking groove accommodating a corresponding retaining portion and other sections of said covering;
      a rod, being penetrated into a corresponding retaining portion of said covering and inserted into a corresponding caulking groove of an erection tube; and
      a plurality of angled elements, being provided with a plurality of fixation columns sleeved onto both ends of the erection tubes and fitted with a slot accommodating the caulking groove.

2. The greenhouse defined in claim 1, further comprising:
   an aligned mounting hole separately placed at a junction between both sides of the erection tubes and fixation columns of the angled elements, the mounting hole being provided with a fixture.

3. The greenhouse defined in claim 1, further comprising:
   a layering sleeved into the retaining portion of the covering; and
   a screw hole placed at both ends of said layering.

4. The greenhouse defined in claim 1, wherein the angled element is provided with mounting plate, being fitted with a punched hole.

5. The greenhouse defined in claim 1, wherein each truss is shaped trilateral, quadrilateral and or pentagonal shapes.

6. The greenhouse defined in claim 1, wherein the covering is comprised of flexible materials.

7. The greenhouse defined in claim 1, further comprising:
   a tripping portion properly placed onto said covering.

8. The greenhouse defined in claim 7, wherein said tripping portion is activated by zipper, button, magnet, or fastener.

9. The greenhouse defined in claim 1, wherein the plurality of fixation columns corresponding to the plurality of angled elements extend towards different directions.

\* \* \* \* \*